(12) United States Patent
Froling et al.

(10) Patent No.: US 9,108,685 B1
(45) Date of Patent: Aug. 18, 2015

(54) APPARATUS FOR REDUCING VEHICLE DRAG AND COVERING A TONNEAU OF A VEHICLE, AND A METHOD THEREOF

(71) Applicant: GM GLOBAL TECHNOLOGY OPERATIONS LLC, Detroit, MI (US)

(72) Inventors: Thomas H. Froling, Beverly Hills, MI (US); Scott C. Anderson, Sylvan Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/193,566

(22) Filed: Feb. 28, 2014

(51) Int. Cl.
*B62D 35/00* (2006.01)
*B60P 7/02* (2006.01)

(52) U.S. Cl.
CPC .. *B62D 35/00* (2013.01); *B60P 7/02* (2013.01)

(58) Field of Classification Search
CPC .................................................. B62D 35/007
USPC ................................. 296/180.1, 180.2, 180.4
See application file for complete search history.

(56) References Cited

U.S. PATENT DOCUMENTS

| | | | |
|---|---|---|---|
| 6,179,361 B1 * | 1/2001 | Sailors | 296/50 |
| 6,962,388 B1 * | 11/2005 | Flores | 296/180.1 |
| 7,090,287 B1 * | 8/2006 | Eberst | 296/180.1 |
| 7,874,610 B2 * | 1/2011 | Khalighi | 296/180.1 |
| 8,408,626 B1 * | 4/2013 | Herndon | 296/26.11 |
| 2002/0163223 A1 * | 11/2002 | Lehmann | 296/180.1 |

* cited by examiner

*Primary Examiner* — H Gutman
(74) *Attorney, Agent, or Firm* — Quinn Law Group, PLLC

(57) ABSTRACT

An apparatus for a vehicle is provided. The vehicle generally has a front wall, two side walls, a truck bed, and a tailgate that altogether define a tonneau. The apparatus includes a tonneau cover that has a front panel and a rear panel. The tonneau cover is slidable along the side walls of the vehicle to move between a closed position and an extended position. In the closed position, the tonneau cover substantially covers the tonneau. In the extended position, at least a portion of the rear panel overhangs the tailgate exterior to the tonneau. The tonneau cover is securable in at least one of the closed position and the extended position.

18 Claims, 2 Drawing Sheets

APPARATUS FOR REDUCING VEHICLE DRAG AND COVERING A TONNEAU OF A VEHICLE, AND A METHOD THEREOF

TECHNICAL FIELD

The present invention relates to an apparatus for reducing drag on a vehicle and for covering a tonneau of the vehicle, and a method thereof.

BACKGROUND

Many vehicles, including pickup trucks, have a tonneau, or open compartment, usually at the rear of the vehicle. The vehicle may include a tonneau cover to protect the interior of the tonneau and any items therewithin. The tonneau cover generally is attached or secured to the vehicle, and may be made of rigid panels that are foldable and/or removable, or a flexible fabric material that may be rolled up and stored when not in use.

Many vehicles also include an exterior component to improve upon the vehicle's aerodynamic performance, and therefore, improve upon the fuel economy of the vehicle. Such an exterior component may be, but is not limited to, a spoiler, side underbody, and the like.

SUMMARY

An apparatus for a vehicle is provided. The vehicle generally has a tonneau that is defined by a front wall, two side walls, a truck bed, and a tailgate. The apparatus includes a tonneau cover that has a front panel and a rear panel. The tonneau cover is movable along the side walls of the vehicle between a closed position and an extended position. In the closed position, the tonneau cover substantially covers the tonneau. In the extended position, at least a portion of the rear panel overhangs the tailgate exterior to the tonneau to reduce drag on the vehicle. The tonneau cover is securable in at least one of the closed position and the extended position.

A vehicle is also provided. The vehicle includes a front wall, at least two side walls, a truck bed, and a tailgate that altogether define a tonneau. The vehicle also includes the apparatus described above.

A method for reducing drag on a vehicle is further provided. The method utilizes the apparatus described above. The method includes moving the tonneau cover of the apparatus from a closed position to an extended position. The method then includes securing the tonneau cover in the extended position. As explained above, in the extended position, at least a portion of the rear panel overhangs the tailgate exterior to the tonneau to reduce the drag.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
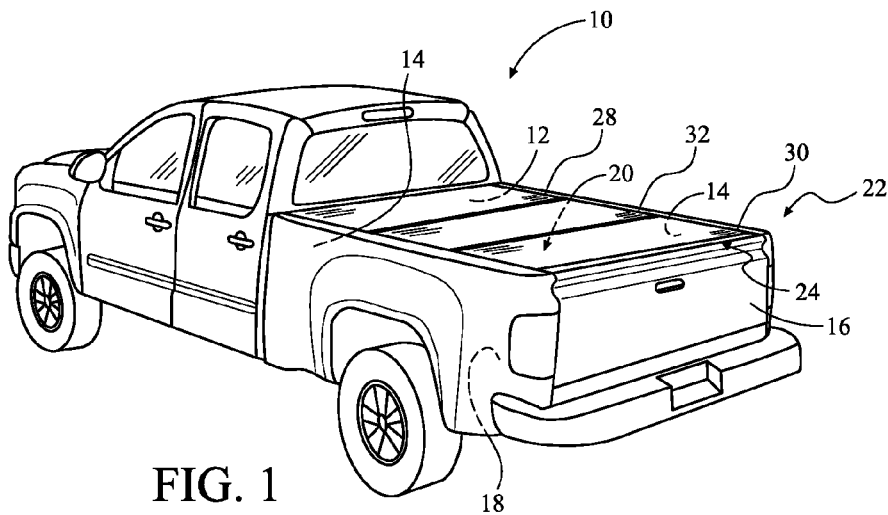
FIGS. 1, 2, and 3 are schematic, perspective views of a vehicle and an apparatus for covering a tonneau of the vehicle, where the apparatus is in a closed position, an extended position, and an open position, respectively.
Figure 2:
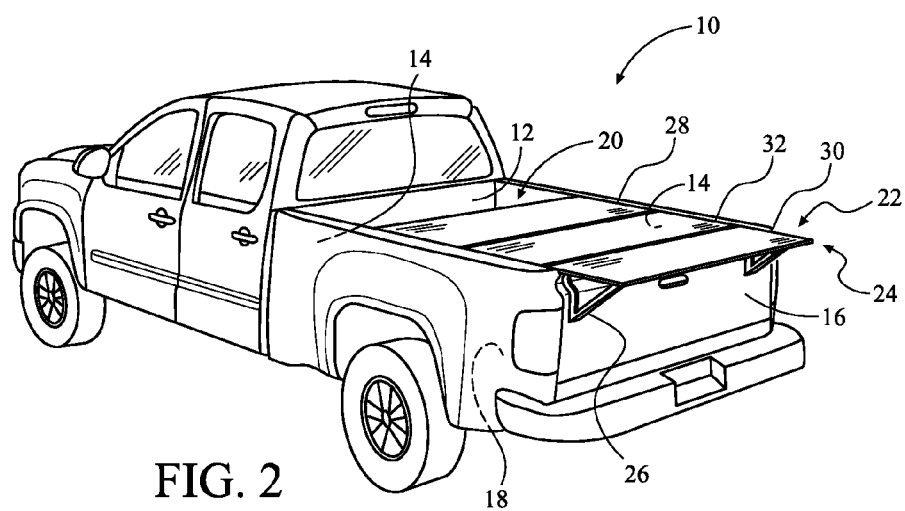
Figure 3:
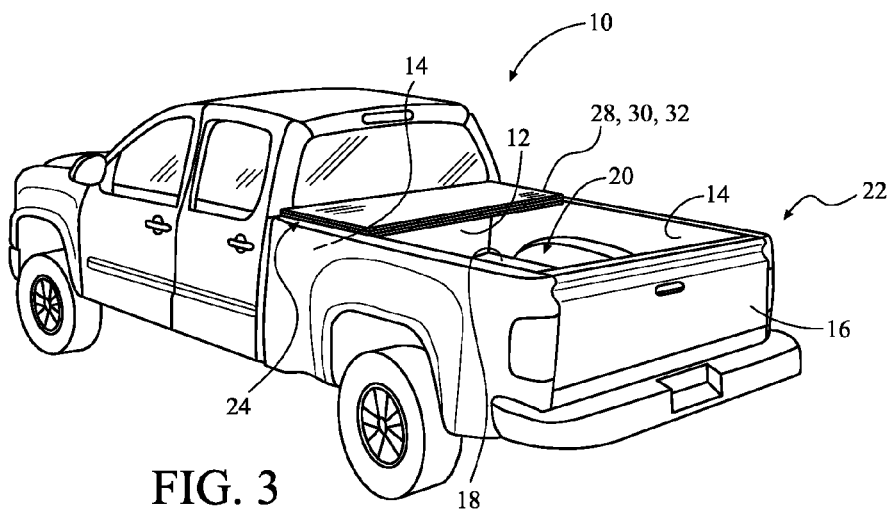

Referring to the drawings, wherein like reference numbers correspond to like or similar components wherever possible throughout the several figures, a vehicle 10 is shown in FIGS. 1, 2, and 3. The vehicle 10 generally has a front wall 12, two side walls 14, a tailgate 16, and a truck bed 18 that altogether define a tonneau 20. While the vehicle 10 is shown as a pickup truck, it should be appreciated that it may be any vehicle that has walls and a floor or a base defining a tonneau.

An apparatus 22 for covering the tonneau 20 and for reducing drag on the vehicle 10 is also shown. The apparatus 22 includes a tonneau cover 24. The tonneau cover 24 has a front panel 28 and a rear panel 30. The front panel 28 generally is at the end of the tonneau cover 24 closest to the front wall 12 of the vehicle 10, and the rear panel 30 is at the end closest to the tailgate 16. The tonneau cover 24 also may have at least one intermediate panel 32 between the front panel 28 and the rear panel 30 depending upon such factors as the size, i.e., the length, of the tonneau 20, and the sizes of the front panel 28 and the rear panel 30. The front panel 28, the rear panel 30, and the intermediate panel 32 may be releasably interconnected such that they may move together, as described in more detail below. Alternatively, they may be configured to move independently of each other.

The tonneau cover 24 is configured to move along the side walls 14 of the vehicle 10 between a closed position, as seen in FIG. 1, and an extended position, as seen in FIG. 2. In the closed position, the tonneau cover 24 substantially covers the tonneau 20. In the extended position, a portion of the tonneau cover 24 covers at least a portion of the tonneau 20, and another portion, specifically a portion of the rear panel 30, extends beyond the tonneau 20, overhanging the tailgate 16. The rear panel 30 may be sized and made of a stiff material such that the overhanging portion is of a desired length while still being sufficiently supported by the tailgate 16 and/or the side walls 14 without the use of additional supports. This allows the vehicle 10 to effectively absorb the moment generated by the overhanging portion such that the tonneau cover 24 is securely maintained in the extended position. The rear panel 30 may or may not be the same size as the front panel 28 and/or the intermediate panel 32.

Figure 4:
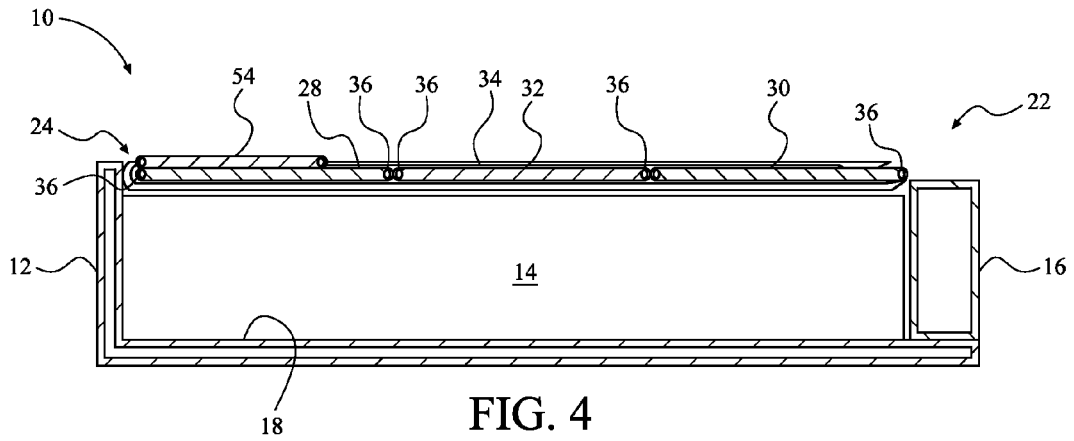
FIGS. 4 and 5 are schematic, cross-sectional views of the apparatus of FIGS. 1, 2, and 3 in the closed position and the extended position, respectively.
Figure 5:
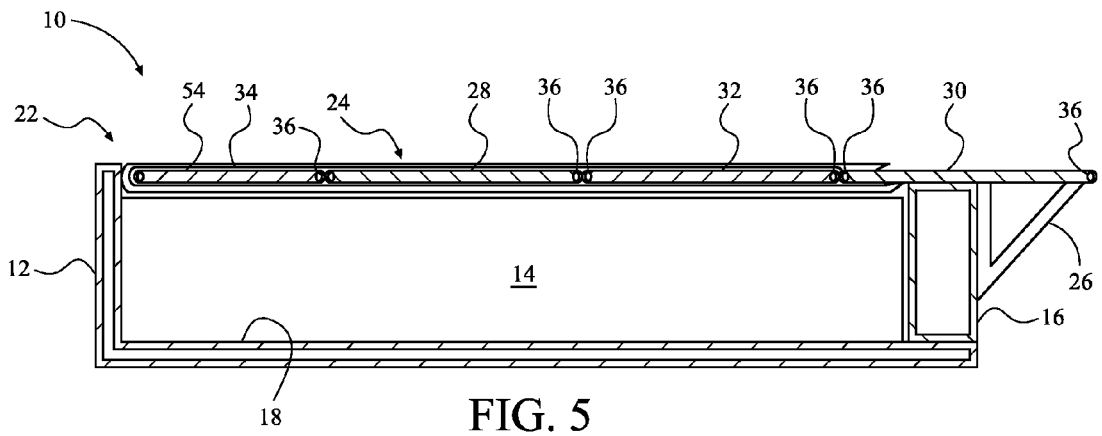
Figure 6:
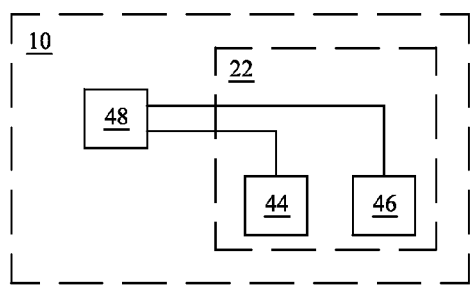
FIG. 6 is a schematic, block diagram of the vehicle of FIGS. 1, 2, and 3.

The extended position effectively extends the length of the vehicle 10, thereby altering the fineness ratio (ratio of length to maximum width) of the vehicle 10, which in turn reduces the drag on the vehicle 10. While FIG. 2 shows the tonneau 20 as being partially exposed at the front wall 12 of the vehicle 10 when the apparatus 22 is in the extended position, it should be appreciated that the apparatus 22 may be configured to substantially cover the tonneau 20 in both the closed and the extended positions, as depicted in FIGS. 4 and 5 and described in more detail below. The apparatus 20 may include a motor 44, as seen in FIG. 6, to move the tonneau cover 24 between the closed position and the extended position, as discussed in more detail below.

The tonneau cover 24 also may be in an open position, as seen in FIG. 3, in which the tonneau 20 is substantially exposed and therefore accessible. As explained above, the front panel 28, the rear panel 30, and the intermediate panel 32 may be releasably interconnected. This may allow for them to fold on top of each other and to be stacked at one end of the tonneau 20 in the open position. While the stacked panels 28, 30, and 32 are shown at the front wall 12 of the vehicle 10, it should be appreciated that they may be stacked at the rear of the vehicle 10 at the tailgate 16, or at any intermediate position along the side walls 14. The stacking of the panels 28, 30, and 32 may be done manually or may be motor operated.

The apparatus 22 also may include a support mechanism 26 attached to the rear panel 30. The support mechanism 26 may be movable between a deployed position or a stowed position, depending upon the position of the tonneau cover 24. The support mechanism 26 may be in the deployed position when the tonneau cover 24 is in the extended position, as seen in FIG. 2. In the deployed position, the support mechanism 26 may be configured to engage with the tailgate 16 to support the weight of the rear panel 30 as it overhangs the tailgate 16 such that the tonneau cover 24 may be maintained in the extended position, as explained above. The support mechanism 26 may be shaped to match the contours of the tailgate 16. In the stowed position, the support mechanism 26 may be stowed such that it does not interfere with the movement of the tonneau cover 24 between the closed position and the extended position, as well as with any objects being stored within the tonneau 20. The support mechanism 26 may be configured to automatically move into the stowed position from the deployed position when the tonneau cover 24 moves from the extended position to the closed position. This may be accomplished as a result of a reactionary force created between the tailgate 16 and the support mechanism 26 when the tonneau cover 24 is moving forward, where the reactionary force may force the support mechanism 26 into the stowed position. Alternatively, the stowing and the deploying of the support mechanism 26 may be motor operated.

In one embodiment seen in FIG. 2, the support mechanism 26 may be a set of brackets that each fold outwardly from the bottom of the rear panel 30 when moving from the stowed position to the deployed position. Each bracket may be attached to the rear panel 30 via hinges, bearings, or any other attachment mechanisms that enable the outward and inward movement of the bracket. In another embodiment not shown, the support mechanism 26 may be a set of linkages that slide out when moving from the stowed position to the deployed position, and collapse when moving from the deployed position to the stowed position. It should be appreciated that any mechanism capable of supporting the rear panel 30 and of moving between a stowed position and a deployed position is also within the scope of the present invention.

Referring now to FIGS. 4 and 5, the apparatus 22 may also include a set of rails 34 in which the tonneau cover 24 is slidable. Each of the rails 34 may be attached to one of the side walls 14, or alternatively may be integrated within the side walls 14. The rails 34 may be positioned higher than the tailgate 16. This allows the rear panel 30 to slide over the tailgate 16 with minimal interference when the tonneau cover 24 is moving between the closed position and the extended position.

The front panel 28, the intermediate panel 32, and the rear panel 30 each may be attached to the rails 34 via a set of pins 36 (one on each lateral side of the rear panel 30 for each rail 34) that are slidable within the rails 34. The pins 36 may be retractable such that any one of the panels 28, 30, and 32 may be detachable from the rails 34. This may allow for each panel 28, 30, and 32 to be removed from the vehicle 10. Alternatively, this may allow for each panel 28, 30, and 32 to be folded on top of each other to move into the open position, as seen in FIG. 3 and described above. While the front panel 28 and the intermediate panel 32 are each shown with two sets of pins 36, it should be appreciated that each panel 28, 30, and 32 may have any number of pins. It should also be appreciated that any fastening mechanism, device, and the like capable of releasably attaching the panels 28, 30, and 32 to the rails 34 such that they are slidable therewithin is also within the scope of the present invention.

The apparatus 22 also may include a latch device 46, as seen in FIG. 6, to engage with the rear panel 30 to lock the tonneau cover 24 in the closed position and/or the extended position. The latch device 46 may be manually or electronically released and/or activated.

The tonneau cover 24 also may include an extension panel 54. The extension panel 54 is configured to close the opening to the tonneau 20 created when the other panels 28, 30, and 32 are moved to the extended position. As explained above, this allows the tonneau 20 to be covered in both the closed position and the extended position to protect it as well as any cargo stored within it from the elements, debris, and the like. The extension panel 54 may be attached to the rear panel 30 such that it folds down from the top of the rear panel 30 to cover the opening. The extension panel 54 may be made of a series of smaller panels (not shown) such that the opening may be covered in smaller intervals to minimize the time that the tonneau 20 is exposed. In another embodiment not shown, the extension panel 54 may be housed and deployed from within the front wall 12.

Referring now to FIG. 6, the vehicle 10 may include a controller 48 to control the operation of the apparatus 22. As explained above, the apparatus 22 may include a motor 44 to move the tonneau cover 24 between positions. The motor 44 is in electrical communication with the controller 48. Also as explained above, the support mechanism 26 may be motor operated to move between the stowed position and the deployed position. The controller 48 may be dedicated to operating the apparatus 22, or may be configured to operate other devices and/or systems (not shown) within the vehicle 10. The controller 48 may further be configured to release the latch device 46 described above, such as when the controller 48 commands the motor 44 to move the tonneau cover 24 from the closed position into the extended position.

Figure 7:
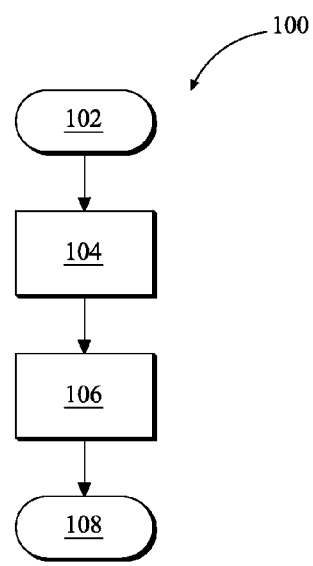
FIG. 7 is a schematic, flow diagram illustrating a method of operating the apparatus of FIGS. 4 and 5 to reduce drag on the vehicle.

Referring now to FIG. 7, a method 100 for reducing drag on the vehicle 10 via the apparatus 22 is shown. Method 100 begins at step 102 at which the tonneau cover 24 of the apparatus 22 is in the closed position. After step 102, method 100 proceeds to step 104. At step 104, the tonneau cover 24 is moved from the closed position to the extended position. In embodiments in which the tonneau cover 24 is moved by the motor 44, step 104 may involve the controller 48 commanding the motor 44 to move the tonneau cover 24 to the extended position. After step 104, method 100 proceeds to step 106. At step 106, the tonneau cover 24 is secured in the extended position. This may be accomplished by the latch device 46 in embodiments in which the apparatus 22 includes one. Where the latch device 106 is electronically released and/or activated, step 106 may involve the controller 48 activating the latch device 106. Method 100 ends at step 108. In embodiments in which the apparatus 22 also includes the support mechanism 26, method 100 may also include deploying the support mechanism 26 from the stowed position such that it engages with the tailgate 16 to support the rear panel 30 overhanging the tailgate 16. This may be performed by the controller 48.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An apparatus for a vehicle having a tonneau defined by a front wall, two side walls, a truck bed, and a tailgate, the apparatus comprising:
    a tonneau cover having a front panel and a rear panel, the tonneau cover being movable along the side walls of the vehicle between a closed position and an extended position, the tonneau cover being securable in at least one of the closed position and the extended position;
    wherein the tonneau cover substantially covers the tonneau in the closed position; and
    wherein at least a portion of the rear panel overhangs the tailgate exterior to the tonneau in the extended position to reduce drag on the vehicle.

2. The apparatus of claim 1 further comprising a set of rails each attachable to one of the side walls of the vehicle, the front panel and the rear panel being slidable within the rails to move between the closed position and the extended position.

3. The apparatus of claim 2 wherein at least one of the front panel and the rear panel is attached to the set of rails via at least one set of pins that are slidable within the rails, the set of pins being retractable such that the at least one of the front panel and the rear panel is detachable from the set of rails.

4. The apparatus of claim 1 further comprising a support mechanism attached to the rear panel, the support mechanism being configured to engage with the tailgate to maintain the tonneau cover in the extended position, the support mechanism being stowable when the tonneau cover moves from the extended position and the closed position.

5. The apparatus of claim 4 wherein the support mechanism is a set of brackets configured to fold outwardly from beneath the rear panel as the tonneau cover is moving from the closed position to the extended position, and to fold inwardly against the rear panel as the tonneau cover is moving from the extended position to the closed position.

6. The apparatus of claim 1 further comprising a latch device configured to releasably lock the tonneau cover in at least one of the closed position and the extended position.

7. The apparatus of claim 1 further comprising at least one motor in communication with at least one of the front panel and the rear panel to move the tonneau cover between the closed position and the extended position.

8. The apparatus of claim 1 wherein the tonneau cover further comprises at least one extension panel configured to deploy when the tonneau cover is in the extended position to maintain a substantial cover over the tonneau, and to retract when the tonneau cover is in the closed position.

9. A vehicle comprising:
    a front wall, two side walls, a truck bed, and a tailgate altogether defining a tonneau; and
    an apparatus for covering the tonneau and for reducing drag on the vehicle, the apparatus including:
        a tonneau cover having a front panel and a rear panel, the tonneau cover being movable along the side walls of the vehicle between a closed position and an extended position, the tonneau cover being securable in at least one of the closed position and the extended position;
        wherein the tonneau cover substantially covers the tonneau in the closed position; and
        wherein at least a portion of the rear panel overhangs the tailgate exterior to the tonneau in the extended position to reduce the drag.

10. The vehicle of claim 9 wherein each of the side walls include a rail, the front panel and the rear panel being slidable within the rails to move between the closed position and the extended position.

11. The vehicle of claim 10 wherein at least one of the front panel and the rear panel is attached to rails via at least one set of pins that are slidable within the rails, the set of pins being retractable such that the at least one of the front panel and the rear panel is detachable from the rails.

12. The vehicle of claim 9 wherein the apparatus further comprises a support mechanism attached to the rear panel, the support mechanism being configured to engage with the tailgate to maintain the tonneau cover in the extended position, the support mechanism being stowable when the tonneau cover moves from the extended position and the closed position.

13. The vehicle of claim 12 wherein the support mechanism of the apparatus is a set of brackets configured to fold outwardly from beneath the rear panel as the tonneau cover is moving from the closed position to the extended position, and to fold inwardly against the rear panel as the tonneau cover is moving from the extended position to the closed position.

14. The vehicle of claim 9 wherein the apparatus further comprises at least one motor in communication with at least one of the front panel and the rear panel to move the tonneau cover between the closed position and the extended position.

15. The vehicle of claim 14 further comprising at least one controller in electrical communication with the at least one motor, the at least one controller being configured to control the motor to move the tonneau cover between the closed position and the extended position.

16. The vehicle of claim 9 wherein the apparatus further comprises a latch device configured to releasably lock the tonneau cover in at least one of the closed position and the extended position.

17. The vehicle of claim 9 wherein the tonneau cover of the apparatus further comprises at least one extension panel configured to deploy when the tonneau cover is in the extended position to maintain a substantial cover over the tonneau, and to retract when the tonneau cover is in the closed position.

18. A method for reducing drag on a vehicle via an apparatus having a tonneau cover, the vehicle having a tonneau defined by a front wall, two side walls, a truck bed, and a tailgate, and the tonneau cover having a front panel and a rear panel, the method comprising:
    moving the tonneau cover from a closed position to an extended position; and
    securing the tonneau cover in the extended position;
    wherein the tonneau cover substantially covers the tonneau in the closed position; and
    wherein at least a portion of the rear panel overhangs the tailgate exterior to the tonneau in the extended position to reduce the drag.

* * * * *